US005938209A

United States Patent [19]

Sirosh et al.

[11] Patent Number: 5,938,209

[45] Date of Patent: Aug. 17, 1999

[54] SEAL SYSTEM FOR FLUID PRESSURE VESSELS

[75] Inventors: Sadanandan Neel Sirosh; Hans C. Van Oyen, both of Calgary, Canada; Masayuki Tamura, Wako, Japan; Kazutaka Yokoyama, Wako, Japan; Hajime Endo, Wako, Japan

[73] Assignees: Alternative Fuel Systems, Inc., Calgary, Canada; Honda Giken Kogyo Kabushiki Kaisha, Saitama, Japan

[21] Appl. No.: 08/800,873

[22] Filed: Feb. 14, 1997

[51] Int. Cl.[6] ...................................................... F16L 17/067

[52] U.S. Cl. .................... 277/622; 277/910; 220/495.08; 220/589

[58] Field of Search ............................... 220/495.08, 589, 220/590; 277/616, 622, 626, 637, 641, 644, 910; 285/219, 220, 221, 331

[56] References Cited

U.S. PATENT DOCUMENTS

| | | | |
|---|---|---|---|
| 1,583,126 | 5/1926 | Crane | 277/626 X |
| 2,330,425 | 9/1943 | Hilton | 277/626 X |
| 2,444,119 | 6/1948 | Thorn et al. | 277/910 X |
| 5,253,778 | 10/1993 | Sirosh | 220/520 |
| 5,287,987 | 2/1994 | Gaiser | 220/589 |
| 5,494,188 | 2/1996 | Sirosh | 220/590 |
| 5,839,600 | 11/1998 | Moreira et al. | 220/589 X |

OTHER PUBLICATIONS

International Seal & Packing Co., Inc., Catalogue #300, Berlin, NJ, p. iii, Jan. 1995.

*Primary Examiner*—Lynne A. Reichard
*Assistant Examiner*—Greg Binda
*Attorney, Agent, or Firm*—Thorpe, North & Western, L.L.P.

[57] ABSTRACT

A seal system for a pressure vessel which includes a substantially rigid outer shell with at least one opening therein, an inner liner disposed within the outer shell against the inside surface thereof, an opening aligned with the opening of the outer shell and a boss disposed in the opening of the outer shell. The boss includes a neck portion for fitting in the opening of the outer shell, a flange portion extending outwardly from one end of the neck portion and having an upper surface and a lower surface, and a generally cylindrical hollow substantially aligned with the outer shell opening and having an inwardly projecting annular shoulder. The lip segment of the liner extends radially inwardly under the lower surface of the flange portion of the boss and then upwardly into the hollow of the boss, along the interior wall of the hollow until a portion of the lip segment rests on the shoulder.

The seal system includes an attachment or coupling device having a generally cylindrical, downwardly extending lower insert section. The lower insert section includes an annular bottom wall in which is formed an annular recess opened downwardly. An upper head section is formed at the upper end of the insert section and includes a radially extending flange. The insert section is dimensioned to fit in and be received by the hollow of the boss above the shoulder. The seal system also includes a resilient O-ring for disposition in the recess of the insert section of the coupling device to protrude from the recess a sufficient distance to contact and seal against the lip section of the liner resting on the shoulder of the boss hollow, when the insert section is fitted into the hollow.

10 Claims, 2 Drawing Sheets

SEAL SYSTEM FOR FLUID PRESSURE VESSELS

BACKGROUND OF THE INVENTION

This invention relates to fluid pressures which incorporate non-metallic liners, and in particular to a seal system for forming a seal between a vessel access adapter device and the vessel liner.

Composite (fiber reinforced resin matrix) containers or vessels have come into common use for storage of a variety of fluids under pressure, including storage of oxygen, natural gas, nitrogen, rocket fuel, propane, etc. Such composite construction provides numerous advantages such as lightness in weight and resistance to corrosion, fatigue and catastrophic failure. This combination of lightness in weight and resistance to failure is possible due to the high specific strengths of the reinforcing fibers or filaments (carbon, glass, aramid, etc.) which, in the construction of pressure vessels, are typically oriented in the direction of the principal forces.

Because the resin matrix of the composite pressure vessel (shell) is subject to cracking and crazing during service and use, the vessels are oftentimes furnished with fluid impermeable liners. While metal liners are most common, elastomeric rubber and thermoplastic liners have become increasingly the liner of choice since thin metal liners (the thinness being necessary to reduce the weight) have low fatigue life. Advantageously, the liners are designed not only to prevent leaks from the vessel, but also to serve as mandrels during vessel fabrication, i.e., profile definition for the composite shell.

One problem with the use of non-metallic liners is that of securely attaching the liners to the vessel bosses which are typically metallic. The end-bosses support fluid passage into and out of the vessel and also may function in the fabrication of the composite shell by providing for fiber turnaround at the ends or poles of the vessel and for mandrel support if filament winding is used to construct the shell.

Although a number of prior art approaches have been suggested for attaching non-metallic liners to bosses, one approach which has proven desirable is disclosed in U.S. Pat. No. 5,494,188. In the arrangement described in the patent, a boss is employed which has a cylindrical neck portion, an annular collar extending radially outwardly from the neck portion, a central hollow or bore extending axially through the neck portion, and an annular groove formed in the bore to include downwardly and inwardly sloping shoulders on one side of the groove. The boss is disposed in an opening in the exterior composite structure shell. The liner also includes an opening aligned with the opening in the shell and the perimeter of the liner opening is formed with a radially inwardly projecting section for underlying the bottom of a collar of the boss and extending upwardly into the bore, over the shoulder and to the groove. An attachment mechanism is then disposed in the bore of the boss above the shoulder, to contact the liner section disposed over the shoulder.

It is desired that the seal between the attachment mechanism and the liner section positioned over the shoulder formed in the bore be as reliable as possible over wide temperature ranges including low temperatures.

SUMMARY OF THE INVENTION

It is an object of the invention to provide a new and improved seal system for fluid pressure vessels and access attachment mechanisms.

It is also an object of the invention to provide such a seal system for developing a seal between an attachment mechanism and a non-metallic interior liner of pressure vessels.

It is a further object of the invention to provide such a seal system which maintains its integrity at low temperatures and high temperatures.

The above and other objects of the invention are realized in a specific illustrative embodiment of a seal system for a pressure vessel which includes a substantially rigid outer shell with at least one opening therein, an inner liner disposed within the outer shell against the inside surface thereof and including an opening aligned with the opening of the outer shell, and a boss disposed in the opening of the outer shell. The boss includes a neck portion for fitting in the opening of the outer shell, a flange portion extending outwardly from one end of the neck portion and having an upper surface and a lower surface, and a generally cylindrical hollow substantially aligned with the outer shell opening and having an inwardly projecting annular shoulder. The lip segment of the liner extends radially inwardly under the lower surface of the flange portion of the boss and then upwardly into the hollow of the boss, along the interior wall of the hollow until a portion of the lip segment rests on the shoulder.

The seal system includes an attachment or coupling device having a generally cylindrical, downwardly extending lower insert section. The lower insert section includes an annular bottom wall in which is formed an annular recess opened downwardly. An upper head section is formed at the upper end of the insert section and includes a radially extending flange. The insert section is dimensioned to fit in and be received by the hollow of the boss above the shoulder. The seal system also includes a resilient O-ring for disposition in the recess of the insert section of the coupling device to protrude from the recess a sufficient distance to contact and seal against the lip section of the liner resting on the shoulder of the boss hollow, when the insert section is fitted into the hollow.

In accordance with one aspect of the invention, the cross-section of the O-ring is generally oval or polygonal in shape, with the long axis of the oval aligned with the opening of the recess.

In accordance with another aspect of the invention, the cross-section of the O-ring is generally hexagonal, having two opposing long sides disposed adjacent to respective sidewalls of the recess.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
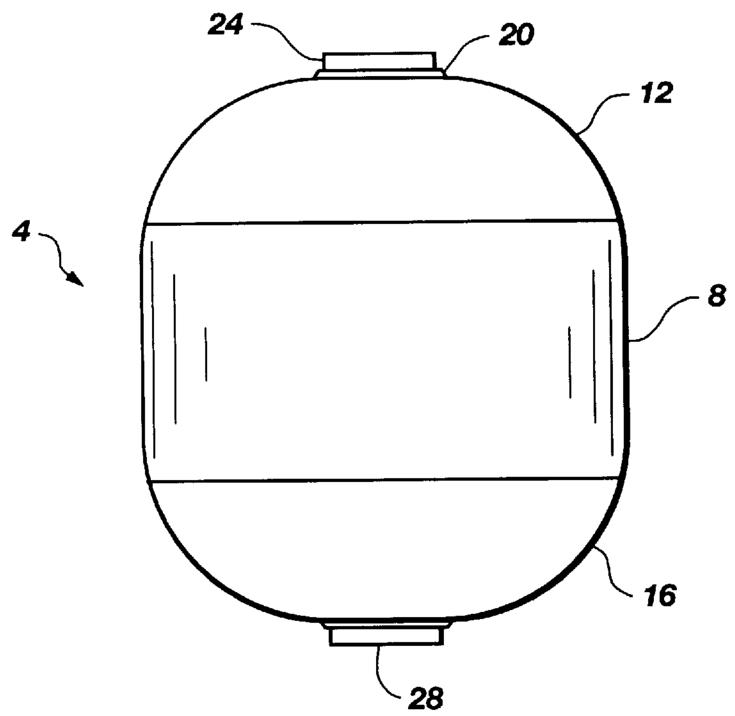
FIG. 1 is a side, elevational view of a composite vessel of the type for which the present invention is especially suitable.

Referring to FIG. 1, there is shown a typical composite (fiber-reinforced resin) pressure vessel 4 in which the present invention may be utilized. The vessel 4 includes a hollow, generally cylindrical central section 8, and integral oblate end sections 12 and 16. At least one of the end sections, for example end section 12, includes an axially-aligned opening 20 in which is disposed an access boss 24. The boss 24 is typically constructed of metal or metal alloy and is provided for receiving attachments, couplings or adapters such as valves to allow for the supply of fluid into and removal of fluid from the vessel 4. A boss 28 is also typically devised at the other end of the vessel and used, along with boss 24, during fabrication of the vessel, for fiber turnaround and mandrel support.

Although the bosses 24 and 28 are shown positioned in the end sections 12 and 16 respectively, the bosses may be placed at other locations, and more than two bosses may be provided. Also, fully spherical vessels could be provided as could other conventional container shapes, with bosses provided where desired.

Figure 2:
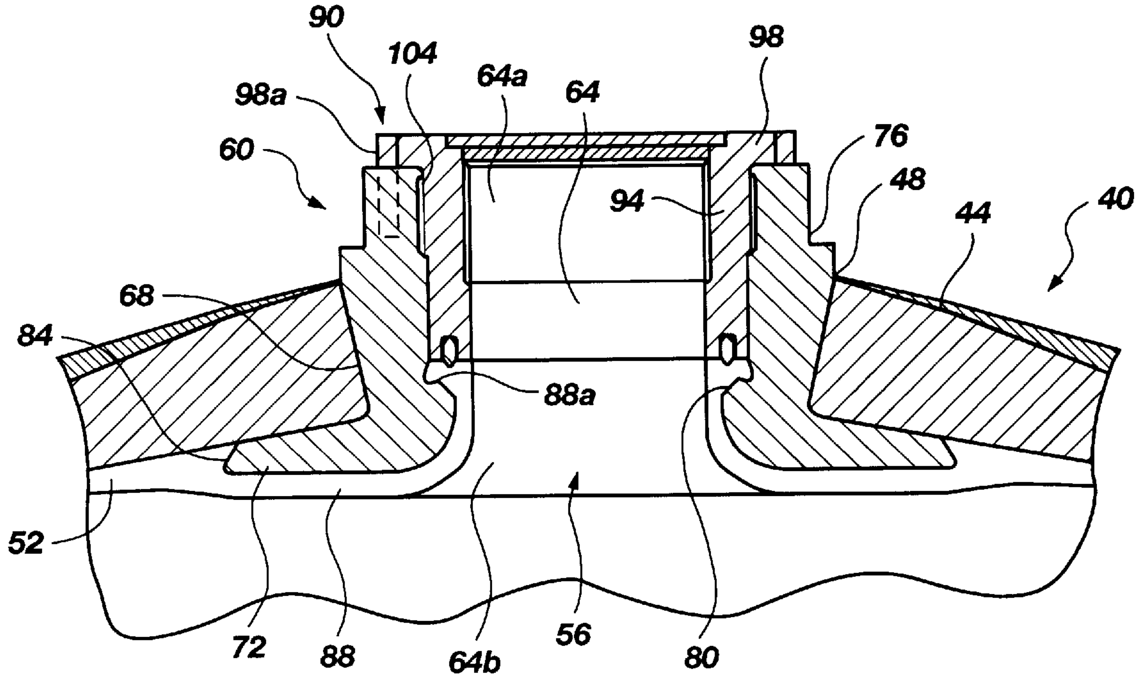
FIG. 2 is a side, cross-sectional, fragmented view of a fluid pressure vessel including a seal system made in accordance with the principles of the present invention.

FIG. 2 shows a side, cross-sectional, fragmented view of a fluid pressure vessel 40 made in accordance with the present invention. The pressure vessel 40 includes an exterior shell 44 having an opening 48. The shell 44 is formed of a composite fiber-reinforced resin in the conventional manner.

Disposed inside the shell 44 is a fluid impermeable liner 52 made, for example, of a thermal plastic material such as polyethylene, nylon polyamide, or polyethylene terephthalate (PET). The liner 52 is disposed against the inside surface of the shell 44 and thus has the same general form as the shell including an opening 56 which is lined with the opening 48 of the shell.

Disposed in the adjacent openings 48 and 56 of the shell and liner respectively is an end boss 60, typically made of a metal or metal alloy such as aluminum or carbon chromiummolybdenum alloy steel. The boss 60 is formed with an axial cylindrical hollow or bore 64, an upper portion 64*a* of which is for receiving an attachment, coupling or adapter such as a valve or other device, for supplying fluid into and removing fluid from the vessel 40. The bore 64 also is formed with a lower portion 64*b*, which has a smaller diameter than the upper portion 64*a*. The boss 60 is also formed with a generally cylindrical neck portion 68 which fits within the opening 48 of the shell 40, and an annular collar or flange portion 72 extending radially outwardly from the lower end of the neck portion. Formed in the hollow 64 of the boss 60 is a circumferential groove 76, the lower or bottom side of which is formed with a downwardly and inwardly sloping shoulder 80.

The portion of the liner 52 surrounding the opening 56 in the liner is formed into a dual-lip arrangement to include an upper, short lip segment 84 which overlies a small portion of the upper surface of the flange portion 72 of the boss. The dual-lip configuration of the liner 52 also includes a lower lip segment 88 which extends from the underside of the upper lip segment 84 radially inwardly under the lower surface of the flange portion 72 of the boss, and then upwardly into the hollow 64 along the walls of the hollow. The termination of the lower lip segment 88 is formed into an annular bead 88*a* which fits within the circumferential groove 76 of the boss 60.

With the dual-lip configuration of the liner 52 and the design of the boss 60, there is no need for adhesively bonding the boss to the liner. As will be described momentarily, placement of an attachment or adapter 90 in the bore 64 further assists in securing the coupling of the boss 60 to the liner 52.

Figure 3:
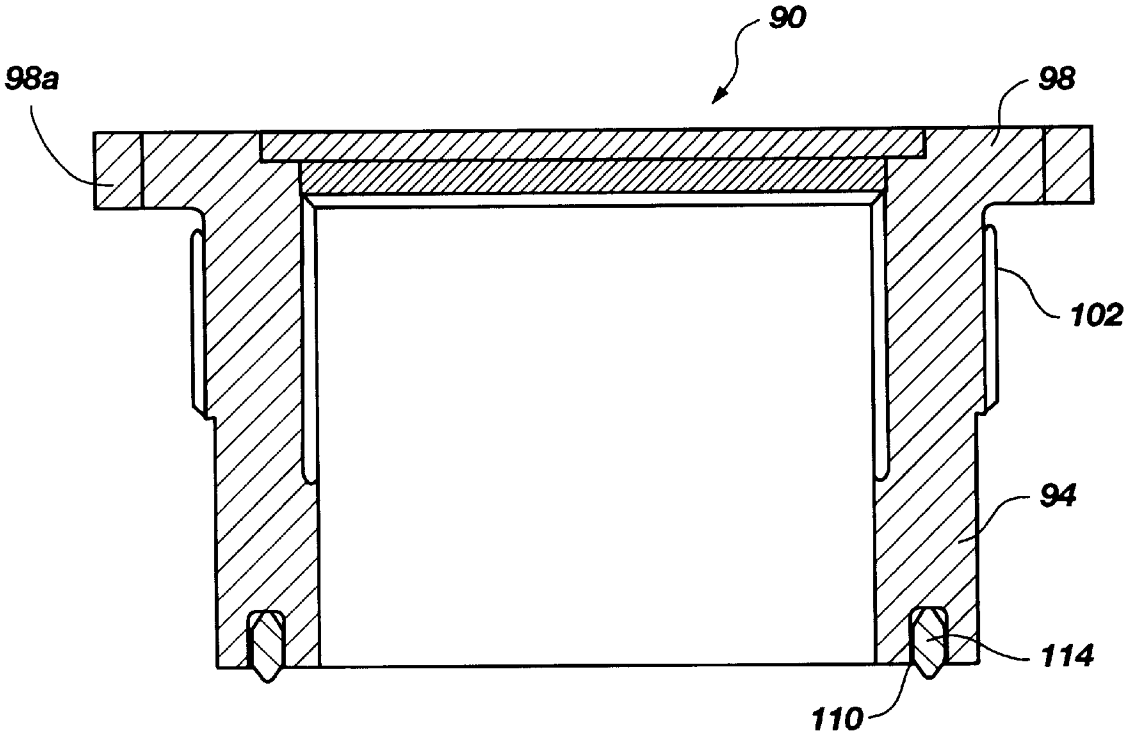
FIG. 3 is a side, cross-sectional view of a coupling device or adapter made in accordance with the principles of the present invention.

The adapter 90 includes a lower insert portion having cylindrical sidewalls 94 and an upper head portion 98 having flanges 98*a* which extend radially outwardly as shown. Advantageously, the adapter 90 includes exterior threads 102 (FIG. 3) which are compatible with and may be screwed into corresponding threads 104 formed in the inlet portion 64*a* of the bore 64 (FIG. 2).

Figure 4:
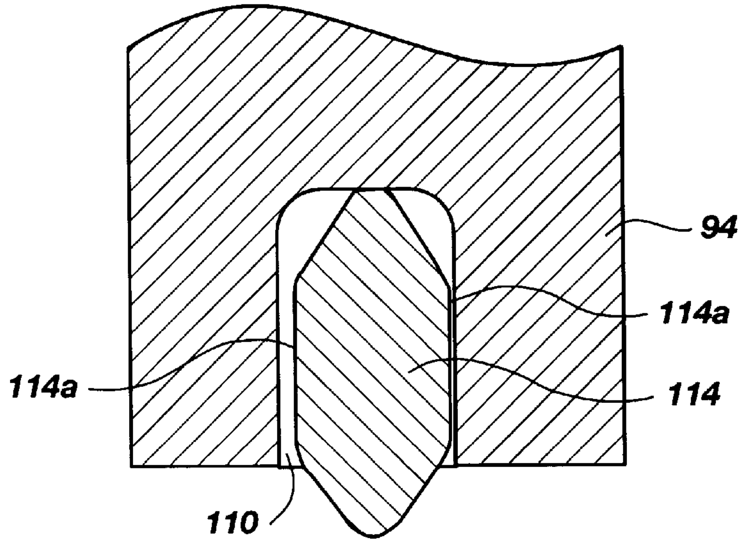
FIG. 4 is a side, cross-sectional, fragmented view of the seal system of the present invention.

Referring again to FIG. 3 and to FIG. 4, there is shown an annular recess 110 formed in the bottom of the sidewall 94 of the adapter 90. Disposed in the recess 110 is a resilient O-ring having a generally oval cross-section as best seen in FIG. 4. Advantageously, the O-ring 114 has a generally hexagonal cross-section with long opposing sides 114*a* being disposed adjacent to the sidewalls of the recess 110, as best seen in FIG. 4.

With this configuration, when the adapter 90 is screwed into the inlet portion 64*a* of the central hollow 64 of the boss 60, the O-ring 114 contacts and seals with the bead 88*a* of the liner 88 and presses it against the shoulder 80. As a consequence, the O-ring 114 is compressed and fills out the recess 110 to further secure the seal.

With the configuration of the O-ring 114 being generally oval in cross-section and making direct contact with the liner 88, the seal integrity is maintained at both low and high temperatures. In particular, the O-ring 114 does not become crystallized at low temperature and therefore maintains the seal. Similarly at high temperatures, the compression of the seal is not lost because of softening and so again maintains the integrity of the seal. Finally, with the oval shape of the O-ring, the ring will seat deeper and thus have more side support in the recess 110 than with other configurations.

Advantageously, the O-ring 114 may be made of nitrile-butadiene rubber, fluoro rubber of the polymethylene type having a substituent fluoro and perfluoro-alkyl or perfluoroalkoxy groups on the polymer chain and copolymer of ethylacrylate or other acrylate and a small amount of monomer which facilitates vulcanization, or other resilient available materials.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A seal system for fluid containers having a substantially rigid outer shell with at least one opening therein, an inner liner disposed within the outer shell against the inside surface thereof and including an opening aligned with the opening of the outer shell, the opening of the liner being formed with a lip segment which terminates in an annular bead, the opening of the outer shell receiving a boss which includes a neck portion fitted in the outer shell opening, a flange portion extending outwardly from one end of the neck portion and having an upper surface and a lower surface, and a generally cylindrical hollow substantially aligned with the outer shell opening and having an inwardly projecting annular shoulder, the lip segment extending radially inwardly under the lower surface of the flange portion of the boss and then upwardly into the hollow of the boss, along the interior wall of the hollow until the annular bead rests on the shoulder, said seal system including an adapter means comprising a generally cylindrical, downwardly extending lower insert section having an annular bottom wall in which is formed an annular recess open downwardly, and an upper head section having a radially extending flange, the insert section dimensioned to fit in and be received by the hollow of the boss above the shoulder, and a resilient O-ring for disposition in the recess of the insert section to at least protrude from the recess to contact and seal against the annular bead resting on the shoulder when the insert section of the adapter means is fitted into the hollow, wherein the O-ring has a cross-section.

2. A seal system as in claim 1 wherein the cross-section of the O-ring is generally oval in shape, with the long axis of the oval aligned with the opening of the recess.

3. A seal system as in claim 2 wherein the O-ring is made of a resilient material.

4. A seal system as in claim 3 wherein the O-ring material is selected from the group consisting of nitrile-butadiene rubber, hydrogenated nitrile-butadiene rubber, copolymer of ethylene propylene and a diene with the residual unsaturated portion of the diene in the side chain, fluoro rubber of the polymethylene type having substituent fluoro and perfluoroalkyl or perfluoroalkoxy groups on the polymer chain, silicone rubber fluorine vinyl and methyl substituent groups on the polymer chain (fluoro silicone rubber) and thermoplastic elastomer.

5. A seal system as in claim 1 wherein the cross-section of the O-ring is generally hexagonal having two opposing long sides disposed adjacent to respective sidewalls of the recess.

6. A seal system as in claim 1 wherein the sidewall of the hollow of the boss includes threads above the shoulder, and wherein the exterior surface of the sides of the insert section includes threads to enable screwing the insert section into the hollow.

7. A seal system for a fluid pressure vessel having an opening in which is disposed a boss having a central elongate opening generally aligned with the opening in the pressure vessel, the elongate opening having a first diameter at an upper end thereof, a second, smaller diameter at a lower end thereof, and a shoulder formed between the upper end and lower end, said vessel including an interior liner having an opening circumscribed by a lip which extends radially inwardly and upwardly into the elongate opening of the boss to rest on the shoulder, said seal system including attachment means through which fluid may be introduced into and removed from the vessel, said attachment means comprising a hollow cylindrical wall having a lower end in which is formed an annular, downwardly facing channel, said cylindrical wall shaped to fit in the elongate opening of the boss, above the shoulder, and a head disposed at the upper end of the cylindrical wall, and a resilient, annular ring seal disposed in the annular channel so that a portion of the ring seal projects out of the channel to contact and press against the lip resting the shoulder when the attachment means is inserted into the elongate opening, to thereby provide a seal between the attachment means and interior liner, wherein the ring seal has a cross-section.

8. A seal system as in claim 7 wherein the cross-section of the ring seal is generally oval in shape.

9. A seal system as in claim 7 wherein the cross-section of the ring seal is hexagonal, having a long axis.

10. A seal system as in claim 9 wherein the ring seal is disposed in the channel so that the long axis of the cross-section extends downwardly toward shoulder formed in the elongate opening.

* * * * *